(12) United States Patent
Cottam et al.

(10) Patent No.: US 7,827,870 B2
(45) Date of Patent: Nov. 9, 2010

(54) METER

(75) Inventors: David Cottam, Sheffield (GB); Mark Andrew Fairman, Matlock Bath (GB); Neil Furmidge, Sheffield (GB)

(73) Assignee: Severn Trent Metering Services Limited, Derbyshire (GB)

( * ) Notice: Subject to any disclaimer, the term of this patent is extended or adjusted under 35 U.S.C. 154(b) by 0 days.

(21) Appl. No.: 12/351,233

(22) Filed: Jan. 9, 2009

(65) Prior Publication Data

US 2009/0173168 A1 Jul. 9, 2009

Related U.S. Application Data

(63) Continuation-in-part of application No. 11/411,682, filed on Apr. 26, 2006, now abandoned.

(60) Provisional application No. 60/677,960, filed on May 5, 2005.

(30) Foreign Application Priority Data

Apr. 26, 2005 (GB) ................................. 0508342.3

(51) Int. Cl.
*G01F 1/20* (2006.01)
(52) U.S. Cl. ................................. 73/861.19; 73/861.18
(58) Field of Classification Search .. 73/861.18–861.19
See application file for complete search history.

(56) References Cited

U.S. PATENT DOCUMENTS

| | | | |
|---|---|---|---|
| 3,640,133 A | 2/1972 | Adams |
| 4,107,990 A | 8/1978 | Ringwall |
| 4,550,614 A | 11/1985 | Herzl |
| 4,976,155 A | 12/1990 | Challandes |
| 5,062,305 A | 11/1991 | Hansen |
| 5,063,786 A | 11/1991 | Sanderson et al. |
| 5,339,695 A | 8/1994 | Kang et al. |
| 5,363,704 A | 11/1994 | Huang |

(Continued)

FOREIGN PATENT DOCUMENTS

DE 3117223 11/1982

(Continued)

OTHER PUBLICATIONS

LaFlamme, Peter. "Low Voltage Bus Interface Logic: Constraints and Challenges for the Future". IEEE 1997 <http://ieeexplore.ieee.org/stamp/stamp.jsp?tp=&arnumber=632344&isnumber=13720>.*

(Continued)

*Primary Examiner*—Lisa M Caputo
*Assistant Examiner*—Jonathan Dunlap
(74) *Attorney, Agent, or Firm*—D'Ambrosio & Menon, LLP; Jo Katherine D'Ambrosio

(57) ABSTRACT

A fluidic oscillator liquid flow meter comprising a body having an inlet portion to receive a flow of liquid to be measured, an outlet portion, a main channel defining a flow path between the inlet and outlet, the flow path including feedback structure to induce oscillations in the flowing fluid, the oscillations being detected by detector comprising means to apply a magnetic field across the flow path and sensing electrodes to detect the resulting e.m.f., the electrodes being positioned such that they protrude from the body into the flow path. A meter having driving signal means, which applies an alternating driving signal to the sensing electrodes, is also disclosed.

33 Claims, 3 Drawing Sheets

U.S. PATENT DOCUMENTS

| | | | |
|---|---|---|---|
| 5,426,984 A * | 6/1995 | Rovner et al. | 73/861.17 |
| 5,827,976 A | 10/1998 | Stouffer et al. | |
| 5,893,383 A | 4/1999 | Facteau | |
| 6,392,416 B1 | 5/2002 | Keech | |
| 6,553,844 B2 | 4/2003 | Drzewiecki | |
| 6,708,569 B2 | 3/2004 | Budmiger | |
| 6,804,613 B2 | 10/2004 | Ishikawa | |
| 6,817,249 B2 | 11/2004 | Yamazaki | |
| 6,860,157 B1 | 3/2005 | Yang et al. | |
| 6,952,970 B1 | 10/2005 | Furmidge et al. | |
| 7,117,750 B2 * | 10/2006 | Brockhaus et al. | 73/861.12 |
| 7,204,157 B2 * | 4/2007 | Furmidge et al. | 73/861.19 |
| 2003/0005777 A1 | 1/2003 | Budmiger | |
| 2003/0029249 A1 | 2/2003 | Keech | |
| 2003/0051557 A1 | 3/2003 | Ishikawa | |
| 2004/0149046 A1 | 8/2004 | Yamazaki | |
| 2004/0244498 A1 | 12/2004 | Chen et al. | |
| 2006/0259260 A1 * | 11/2006 | Frohlich et al. | 702/100 |

FOREIGN PATENT DOCUMENTS

| | | |
|---|---|---|
| DE | 10118002 | 10/2002 |
| EP | 0381344 | 8/1990 |
| WO | 9722854 | 6/1997 |

OTHER PUBLICATIONS

Williams, Tim. The Circuit Designer's Companion. Elsevier. Nov. 2004. p. 222.*

* cited by examiner

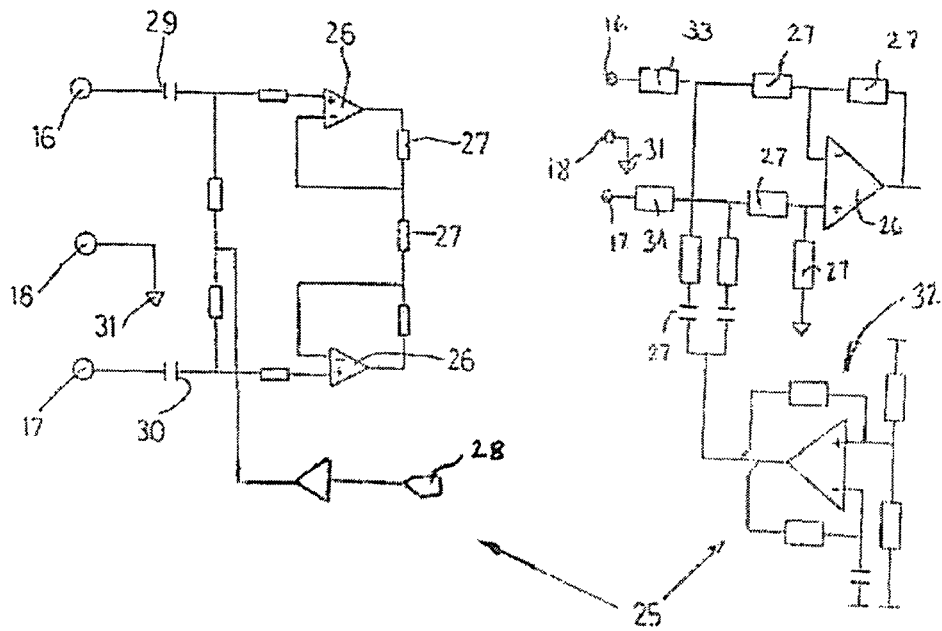
*Fig. 8*  *Fig. 9*
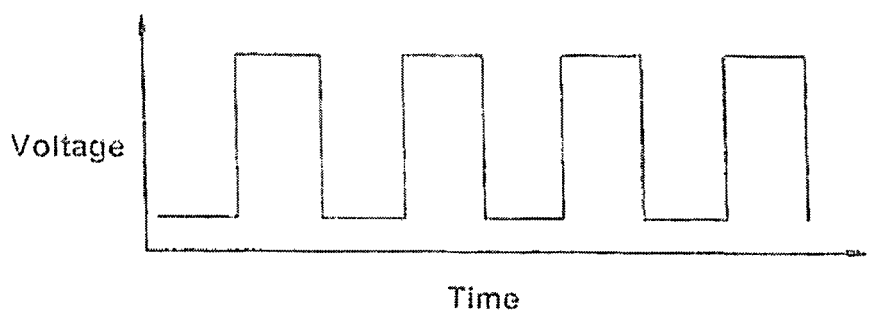
*Fig. 10*
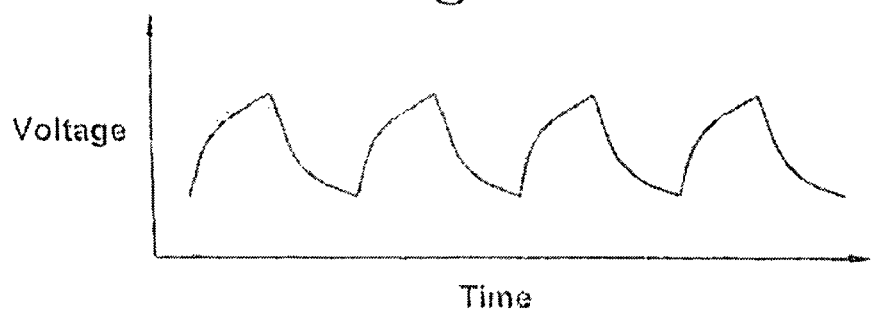
*Fig. 11*

METER

CROSS-REFERENCE TO RELATED APPLICATIONS

The present application is a continuation-in-part of U.S. Ser. No. 11/411,682 filed Apr. 26, 2006 now abandoned, which in turn claims the benefit of U.S. Provisional Application No. 60/677,960, filed May 5, 2005 and Great Britain Patent Application No. 0508342.3, filed Apr. 26, 2005, which are fully incorporated by reference herein.

FIELD OF THE INVENTION

This invention relates to a fluid Flow meter and in particular to a meter for measuring the flow of liquids and operating on the fluidic oscillator principle.

BACKGROUND

The frequency of oscillation of a fluidic oscillator is dependent (though not necessarily linearly) on the rate of flow through it. This principle has been used for the measurement of the flow of liquids and in particular in water meters to measure the water consumption of a property, for example.

SUMMARY

In practice, it can be particularly difficult to obtain accurate measurements (i.e. within one or two percent) in situations where the flow rate can vary over a wide range, and where the pressure of the fluid may vary substantially. Accuracy of measurement needs to be maintained over a large turn-down ratio of 300 to 1 or more and where the flow velocity may also change over a corresponding range.

Fluidic oscillators that are used for measuring water consumption are of various types. One type comprises a body containing an inlet jet leading into a pair of channels separated by a splitter. Downstream of the splitter each channel has a feedback loop that leads back to the path of the fluid adjacent the inlet jet. The two feedback loops lead back to opposing sides of the inlet jet. As is known, the high velocity component of the fluid will "attach" itself to the wall of one of the channels by the Coanda effect, but then as a result of the action of the fluid that is fed back, it will switch across to the other wall. The switching or oscillating is dependent upon the rate of flow.

For a conducting fluid, these oscillations can be detected electromagnetically by applying a magnetic field across the flow and detecting the resulting e.m.f. generated in the liquid itself across a pair of electrodes. The electrodes are mounted flush with the appropriate channel wall so as not to disturb the flow, nor add to the substantial velocity and pressure changes encountered in water metering. Thus, this arrangement can be used in the metering of domestic water supplies as it can be constructed to measure with sufficient accuracy for metering purposes.

The electrodes in fact detect induced signals within the fluid flow. The signals detected by the electrodes are typically processed by signal processing means which may include several stages of signal amplification. The signal processing means should ideally be able to filter out noise in the signal and also cancel common-mode signals, but it is advantageous tor the detected signal to be as 'clean' as possible, that is, that noise and interference in the signal is minimised. Interference may include erroneous signals received by the sensing electrodes due to polarisation of the electrodes or drift of the sensed signal due to chemical interactions between the electrodes and the fluid.

According to a first aspect of the invention, a fluidic oscillator liquid flow meter comprises a body having an inlet portion to receive a flow of liquid to be measured, an outlet portion, a main channel defining a flow path which includes a feedback structure to induce oscillations in the flowing fluid, the oscillations being detected by a detector, the detector comprising magnetic field generating means to apply a magnetic field across the flow path and at least one pair of sensing electrodes to detect the resulting e.m.f., wherein the detector also includes a driving signal applicator which applies an alternating driving signal to the sensing electrodes to prevent polarization of the sensing electrodes in use.

The use of a driving signal and, in particular, an alternating driving signal is advantageous as the sensing electrodes of the detector are conditioned against interference and therefore the metering of fluid flow is accurate and reliable. In particular, the driving signal acts to stabilise the signal detected by the sensing electrodes as it prevents polarization of the sensing electrodes when they are in contact with the fluid to be measured. This is particularly important as the unwanted signals received by the sensing electrodes without the driving signal can dominate making it very difficult to determine the true volume of flow through the meter. Further, the meter can determine whether there is a gas or a liquid flowing through the meter by detecting the signals received from the sensing electrodes when the driving signal applicator is applying the driving signal. Therefore, it can be ensured, in the case of a water meter, that the fluid the meter is measuring is water and not some other fluid such as air.

However, it has been found that the frequency of the applied signal should be different from and preferably substantially different from the range of signals produced by the oscillating fluid flow, which is typically between 0 to 100 Hz. Thus, depending on the rate of flow the alternating driving signal may have a frequency of greater than 200 Hz and less than 1 MHz (or even higher). The alternating driving signal may have a frequency of between 700 Hz and 1 KHz.

The alternating driving signal may be a wave of any suitable pattern. It may be a sine wave or a saw-tooth wave. Alternatively, the signal is substantially a square wave. The alternating driving signal is preferably applied to the electrodes via capacitors and therefore if a square wave is applied through the capacitors the alternating signal at the electrodes is a rounded square wave.

The alternating signal may be of any suitable voltage. A voltage between 0 volts and 3.6 volts is convenient for a water meter.

Further, water may be caused to move inside the oscillator by other external effects such as mechanical vibration or water pressure pulsation although there is no net flow of water, or a reverse flow, which should not be registered by the meter. Under such circumstances it is possible to detect signals at the sensing electrodes that could be confused with signals caused by genuine fluid flow. These signals could be generated by either electromagnetic induction or electrochemical reactions at the surface of the electrodes. Reverse flow of fluid generates an almost random set of signals.

According to a second aspect of the invention we provide a fluidic oscillator liquid flow meter comprising a body having an inlet portion to receive a flow of liquid to be measured, an outlet portion, a main channel defining a flow path between the inlet and outlet, the flow path including feedback structure to induce oscillations in the flowing fluid, the oscillations being detected by a detector, the detector comprising magnetic field generating means to apply a magnetic field across the flow path and at least one pair of sensing electrodes to detect the resulting e.m.f., the electrodes being positioned such that they protrude from the body into the flow path.

This arrangement of the electrodes is particularly advantageous as the electrodes are less sensitive to erroneous signals. Thus, erroneous signals, whatever their cause, can be discounted more easily. The detector is therefore improved without adversely affecting the calibration and stability of the oscillator as a fluid measuring device. It has been found that the positioning of the electrodes such that instead of being flush with the body, they protrude into the flow does not disturb the flow to the extent that accurate measurement is no longer possible and in fact allows particularly accurate metering.

The amount that the electrodes protrude from the body will depend on the size of the channel into which they protrude. Typically at least one of the electrodes will protrude to as much as 50% of the dimension of the channel. This range of protrusion improves the accuracy of the meter while not creating a significant blockage in the flow path, which would result in flow disturbance that may disrupt the oscillations and therefore the accuracy. A typical water meter will have a channel dimension of about 20 mm, and the protrusion distance is then between 0.5 mm and 10 mm. A distance of 5 mm has been found to be particularly effective.

The electrodes may be placed in the main channel. Alternatively, the electrodes may be placed in at least one feedback channel.

The oscillator may include a splitter in the main channel to promote oscillation of the flow. Preferably, the feedback structure comprises two feedback channels that split from the main channel and lead back to rejoin the main channel upstream adjacent the inlet portion.

There may be two pairs of sensing electrodes, each feedback channel having a respective pair. Alternatively, one pair may be located in the feedback channel and another pair located in the main channel.

The magnetic field generating means may comprise at least one permanent magnet. Preferably the at least one magnet is embedded in walls of the body of the meter and is electrically insulated from the fluid flow. The magnet may be made of an electrically non-conducting material such as plastics-bonded ferrite and therefore may form part of the wall of the body.

While the first and second aspects of the invention relate to improving the signals produced by the electrodes, a third aspect aims to improve the accuracy of the detector further by filtering of the signals.

According to a third aspect of the invention, we provide a fluidic oscillator liquid flow meter comprising a body having an inlet portion to receive a flow of liquid to be measured, an outlet portion, a main channel defining a flow path between the inlet and outlet, the flow path including feedback structure to induce oscillations in the flowing fluid, the oscillations being detected by a detector, the detector comprising magnetic field generating means to apply a magnetic field across the flow path and at least one pair of sensing-electrodes to detect the resulting e.m.f., wherein the detector further includes a signal processor, the signal processor including a memory arranged to receive and store the signals sensed by the sensing electrodes, and a comparison processor connected to the memory, the comparison processor being arranged to compare received signals with signals stored in the memory and to determine whether or not a particular signal should be counted by the flow meter.

The signal processor further improves accuracy by filtering out erroneous signals detected by the electrodes. It will be appreciated that the sensing electrodes typically generate a continuous output waveform and the reference to signals received from the sensing electrodes refers to the signal shapes or pulses contained in the waveform. The improved accuracy is advantageously achieved by comparing a given signal with a prediction based on previously received signals from the sensing electrodes stored in the memory. If the signal being compared differs significantly from the predicted signal, the meter may decide not to count the signal in its measurement of the volume of water that passes through it.

The memory may be adapted to store at least two of the most recently sensed signals from the sensing electrodes. This is advantageous as the most recently received signal can be compared to the signal received previously to determine if it is due to fluid flow and therefore valid or due to another cause (external vibration, pulsation of flow or reverse flow) and therefore not valid. Most preferably the memory is arranged to store the most recently received signal from the sensing electrodes and a predetermined number of signals received prior to the most recently received signal. This is advantageous as the comparison processor can compare the most recently received signal with the number of other signals, which may be consecutively received signals, to determine if the most recently received signal is abnormal and therefore possibly erroneous. Thus, the memory acts as a "sliding window" that stores the last predetermined number of signals, signal shapes or pulses from the sensing electrodes. Alternatively, the "sliding window" may be defined in terms of time and therefore the memory may be adapted to store a predetermined number of seconds of output from the sensing electrodes.

The comparison processor is then adapted to compare the signals sensed by the sensing electrodes and determine whether a given signal differs by more than a predetermined threshold value from a previously received signal. This is advantageous as the threshold value can be set such that typical variations in the flow do not disrupt the measurement of the flow volume, while reverberations in the flow or reverse flow can be reliably detected and the respective signals discounted from the measurement of the flow volume.

Alternatively, the memory may be adapted to store not only the most recently received signals, but also known or received patterns of signals, such as represent, for example, steadily increasing or decreasing flow. This enables the comparison processor to compare a set of received signals with a pattern, and then to predict what the next signal may be, to determine whether it falls within the pattern, and is to be counted, or is erroneous, and should not be counted.

BRIEF DESCRIPTION OF THE DRAWINGS

FIG. 8 shows a first embodiment of an electrode driving circuit for use in the flow meter of the first aspect of the invention.

FIG. 9 shows a second embodiment of an electrode driving circuit for use in the flow meter of the first aspect of the invention.

FIG. 10 is a graph showing the form of the alternating driving signal that is applied to the driving circuit electronics.

FIG. 11 is a graph showing the form of the alternating driving signal that is applied to the electrodes through the driving circuit electronics.

DETAILED DESCRIPTION OF THE INVENTION

Figure 1:
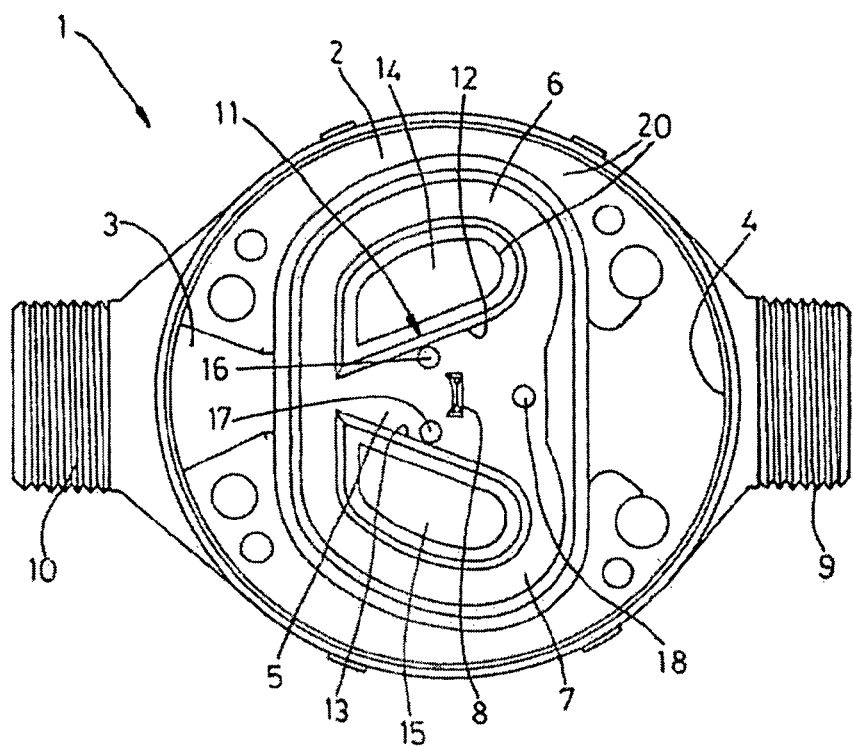
FIG. 1 shows a part sectional view of a fluidic oscillating water meter according to the invention.
Figure 2:
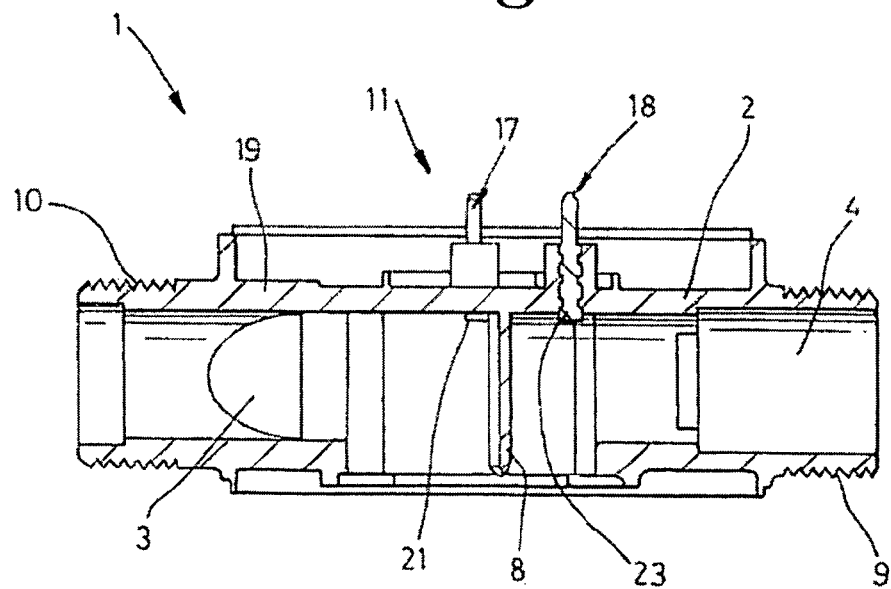
FIG. 2 shows side sectional view of the meter shown in FIG. 1.

A fluidic oscillator 1 is shown in FIG. 1 and is generally of known kind and is for use as a domestic wafer meter. The oscillator meter 1 comprises a body 2, which includes walls 20 that define a plurality of flow paths. The body 2 defines an inlet portion 3, an outlet portion 4 and a main channel 5 therebetween. The body 2 also defines a feedback structure, which comprises two looped feedback channels 6, 7, that split from the main channel 5 and then lead back to rejoin the main channel 5 adjacent the inlet portion 3. A splitter 8 is located centrally in the main channels 5, between splitting and rejoin points of the feedback channels 6, 7.

The inlet portion 3 comprises a narrowed aperture that receives flow from an inlet tube (not shown) that is connected to the inlet portion 3 by a screw thread 10. Similarly, the outlet portion 4 is adapted to receive an outlet tube (not shown) that is connected thereto by a screw thread 9.

Fluid received through the inlet portion 3 flows through the flow path of the main channel 5 and will, by virtue of the Coanda effect, "attach" itself to the one of surfaces 12 or 13. The splitter 8 encourages the flow to be predominantly adjacent one surface 12, 13 or the other. Most of the flow passes straight to the outlet portion 4, but a small amount passes to the feedback structure. If the flow is "attached" to surface 12, the feedback flow will be predominantly to feedback channel 6. This fed-back fluid will disturb the part of the flow adjacent the inlet 3 and will encourage the flow to "attach" itself to the other surface 13. Thus, the flow from inlet portion 3 to outlet portion 4 will oscillate between being "attached" to surface 12. with feedback flow predominantly through feedback channel 6, to being "attached" to surface 13, and feedback flow predominantly through feedback channel 7. These oscillations are dependent on the quantity of flow through the meter 1. The Coanda effect is fundamental to this type of meter as the oscillating fluid flow must reliably attach itself to the walls of the meter. If the oscillations are disrupted the accuracy of the meter can suffer.

The fluidic oscillator meter 1 includes a detector 11. The detector 11 comprises a magnetic field generator in the form of permanent magnets 14, 15 mounted in the walls 20 of the flow paths defined by the body 2. The magnets 14, 15 apply a magnetic field across the flow in the main channel 5. The detector 11 also includes electrodes 16, 17, 18 to detect the resulting e.m.f. generated in the oscillating flow. This signal is used in the metering of the fluid flow through the meter 1.

The electrodes 16, 17, 18 comprise metal cylindrical members that extend through a top wall 19 of the body 2. The distal ends 21, 22, 23 of the electrodes 16, 17, 18 protrude through the body 2 into the flow path of the main channel 5. It was surprisingly found that the protruding electrodes do not disrupt the flow such that the fluid does not reliably attach itself to the walls of the meter. Thus, despite the protruding electrodes causing turbulence in the fluid flow, the fluid oscillations remain sufficiently stable so that accurate measurement of the fluid flow can be made over the typical fluid flow rates experienced in a water meter. The electrodes 16, 17, 18 protrude past the wall 19 of the body 2 a distance of approximately 1 mm. It will be appreciated that the magnets 14, 15 and electrodes 16, 17, 18 can be located elsewhere in the flow paths defined by the body 2. For instance, the magnets 14, 15 may be positioned within opposed walls 20 of the feedback loop 6 or 7, with the electrodes appropriately positioned and protruding into the feed back flow path. Further the electrodes could alternatively protrude a distance of approximately 2, 3, 4, 5, 6, 7, 8 or 9 mm.

The protruding electrodes 16, 17, 18 present a larger surface area to the fluid flow than similarly sized flush electrodes. It has been found that the protruding electrodes provide sensing signals which are less noisy than those from flush electrodes, so that the meter is more accurate. However, a signal processor can improve accuracy further by filtering the signals received from the electrodes 16, 17, 18.

Figure 3:
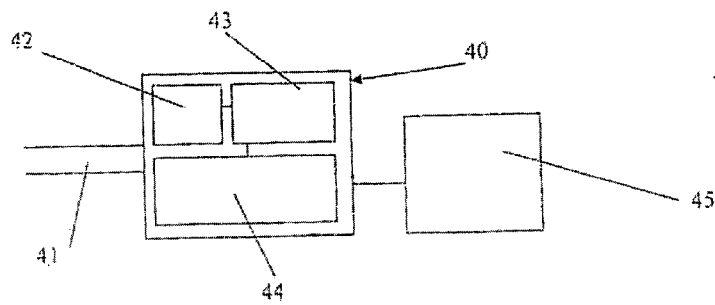
FIG. 3 shows a diagram of the signal processor.

FIG. 3 shows a signal processor 40, which is connected to the sensing electrodes 16, 17, 18 by connections 41. The signal processor 40 comprises a signal analyser 42, a memory 43 and a comparison processor 44. The signal processor 40 is connected to a flow counter 45. The signal analyser 42 coverts the analogue signal received from the sensing electrodes 16, 17, 18 into a digital signal and measures the time period of each oscillation received from the sensing electrodes 16. 17. 18. The time periods measured by the signal analyser 42 are passed to the memory 43. The memory 43 is adapted to store the last two time periods of the signals received from the sensing electrodes 16, 17, 18. The comparison processor 44 is arranged to compare the two time periods contained in the memory 43 to determine if they are indicative of fluid flow or are erroneous pulses caused by noise, for example. This is achieved by determining if the time period of the most recently received pulse is within a threshold range of 50% to 200% of the time period of the penultimate pulse. If the pulses are determined to be valid by the comparison means 44, the time period stored in the memory 43 is passed to the flow counter 45, which accordingly calculates a measure of the volume of fluid flow.

If the comparison processor 44 determines that the difference in time periods is outside the threshold range, then the time period of that pulse is ignored and not passed to the flow counter 45. Alternatively, the comparison processor 44 modifies the time period of the most recently received signal stored in the memory to that of the penultimate signal.

It will be appreciated that the memory may be arranged to store the time periods of more pulses, such as 3, 4, 5 or 10. The comparison processor 44 may compare the time period of the most recently received pulse with an average of the time periods of the other pulses in the memory 43. Depending upon the processing capabilities of the comparison processor 44 and the signal analyser 42, further characteristics of the signals received from the sensing electrodes 16, 17, 18 may be compared, such as the amplitude or shape of the pulse.

In a further alternative, the memory may store patterns of received signals or known patterns of signals, such as for example are expected with a steadily increasing or decreasing flow. The signals being received are then compared with the patterns, to enable the processor 40 to predict a subsequent signal. The actual signal received may then be compared with the predicted signal, and accepted if the period is within a given threshold range of the prediction, or rejected if it lies outside the threshold range. This enables the processor 40 to be even more accurate in its filtering of the signals.

Figure 4:
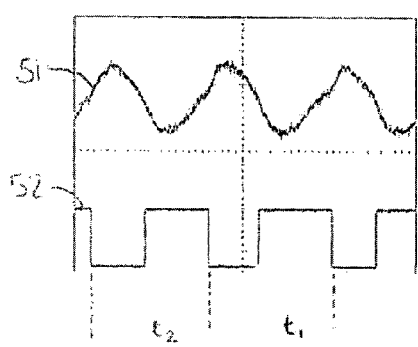
FIG. 4 shows a graph of typical differential signals received from the sensing electrodes during steady state flow.

FIG. 4 shows an example of the signal received by the signal analyser 42, under a steady state flow condition. The first trace 51 shows the differential signal output from the sensing electrodes 16, 17, 18 and trace 52 shows the corresponding digitised signal from which the time period of the pulses are extracted. The differential signal 51 has a uniform pattern with a consistent time period as would be expected under steady state flow. The signal analyser 42 stores the time periods $t_1$ and $t_2$ in the memory 43. The comparison processor 44 compares the time periods $t_1$ and $t_2$ to determine whether $t_1$ differs from $t_2$ more than a predetermined threshold amount. As the time periods $t_1$ and $t_2$ are consistent, the pulses are determined to be valid and therefore the comparison processor 44 passes the time periods in the memory 43 to the flow counter 45, which extracts the information of the volume flow rate and records it.

Figure 5:
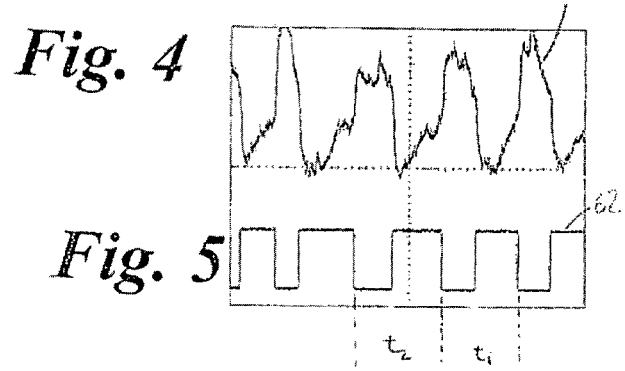
FIG. 5 shows a graph of typical differential signals received from the sensing electrodes during flow influenced by external noise, electrode noise or fluid contaminants.

FIG. 5 shows an example of the signals obtained by the sensing electrodes 16, 17, 18 during flow influenced by external noise, electrode noise or fluid contaminants. In particular, trace 61 shows the raw signal as detected by the sensing electrodes 16, 17, 18 and trace 62 shows the digitised signal as stored in the memory 42. The time periods $t_1$ and $t_2$ of FIG. 5 are not identical even though the flow is steady. However, the comparison processor 44 will compare the time periods to check whether $t_1$ is within a threshold amount of $t_2$. In this example, $t_1$ is 90% of $t_2$ and therefore within the threshold amount of 50%-200%. The comparison processor therefore deems the time period $t_1$ valid and passes it to the flow counter 45.

Figure 6:
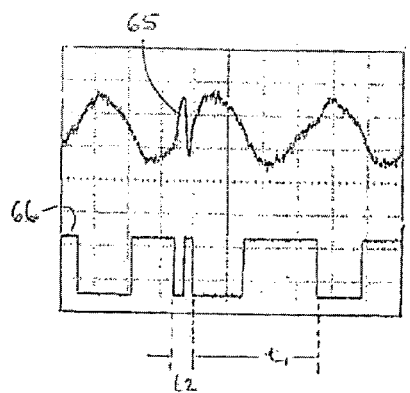
FIG. 6 shows a further graph, of typical differential signals received from the sensing electrodes during flow influenced by external noise, electrode noise or fluid contaminants.

FIG. 6 shows the differential signals received from the sensing electrodes 16, 17, 18 during flow influenced by external conditions. Trace 65 shows the raw signal and trace 66 the digitised signal stored in the memory 42. One of the pulses has a period $t_2$ which is significantly different from the others. This difference will be picked, up by the comparison processor 44, as being outside the threshold range, and will be ignored.

Figure 7:
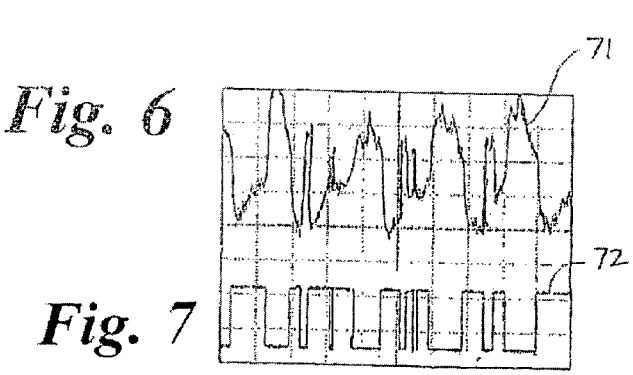
FIG. 7 shows a graph of typical differential signals received from the sensing electrodes during reverse flow.

FIG. 7 shows the differential signals received from the sensing electrodes 16, 17, 18 when a reverse flow condition occurs in trace 71. The corresponding digitized signal in shown, as trace 72.

For detecting reverse flow through the fluidic oscillator meter 1, the different characteristics of the oscillator in the forward and reverse directions is used. With flow in the forward direction regular oscillations are produced, but with flow in the reverse direction the oscillations produced are irregular and unrepeatable. However, both forward and reverse flow generates positive signals at the sensing electrodes 16, 17. 18. By comparing the most recent signal to the previous signals it is possible to determine that the oscillations are irregular and therefore caused by reverse flow. The traces 71 and 72 show the irregular nature of the pulses for reverse flow. The registration of the meter can be stopped when reverse flow is detected. This is a significant advantage for a water meter, where the consumer will only wish to pay for water flowing in a forward direction.

The electrodes comprise two sensing electrodes 16, 17 and one earth electrode 18. The electrodes 16, 17, 18 are connected to a signal conditioning means comprising an electrode bias circuit 25. The earth electrode 18 is connected to ground 31. The electrode bias circuit 25 conditions the sensing electrodes 16 and 17, to improve the quality of the detected signals. Two embodiments of the electrode bias circuit 25 are shown as FIG. 8 and FIG. 9. The electrode bias circuits 25 both include a plurality of operational amplifiers 26 and passive components 27 arranged to apply a conditioning signal to the sensing electrodes 16, 17. In FIG. 8 the conditioning signal is input at 28 and is applied to the sensing electrodes 16, 17 through respective capacitors 29, 30 which may be of polarized type. In FIG. 9 the conditioning signal is generated by an oscillator 32 and applied to the electrodes 16, 17 through resistors 33, 34.

The conditioning signal is applied to each electrode 16, 17 to alter their polarity with reference to the earth electrode 18. The conditioning signal may be applied to both electrodes simultaneously or as a signal alternating between both sensing electrodes.

When the sensing electrodes 16, 17 are placed in the fluid to be measured each electrode will generate a DC potential. This DC potential may take several seconds or even minutes to stabilise, which depends on the material of the electrode and any constituents present in the fluid. During this time the electrode's response to the fluid flow oscillations will be dominated by the stability and rate of change of this DC potential. Thus, the conditioning signal conditions the electrodes so that they can accurately measure the electromotive force (EMF) generated by the oscillations of the fluid through the meter.

The application of an alternating conditioning signal to the electrodes conditions the surface of the electrodes and minimises the drift of the DC potential. The stable and small DC potentials on each electrode that remain can be filtered by appropriate electronics or signal processing software. Thus, the conditioning signal allows the meter to respond rapidly to the induced EMF generated by the water flow in the presence of the magnetic field. By applying the conditioning signal, the signals generated by the oscillating fluid flow in the presence of the magnetic field, which is then detected by the electrodes are stabilised in fluids of varying quality without the need to allow the DC potentials to stabilise.

The form of the conditioning signal applied to the electrode bias circuits 25 is shown in FIG. 10 and is a square wave. It is advantageous to apply a conditioning signal to the electrodes 16, 17 to achieve accurate and reliable metering of the fluid flow. The form of the signal that is applied to the electrodes through capacitors 29, 30 is shown in FIG. 11. As can be seen, the square wave is rounded due to the time constant of the capacitors 29, 30. As will be appreciated, the graphs showing the conditioning signal (FIG. 10) and applied conditioning signal (FIG. 11) are only intended to show the form of the signal and do not give a relative comparison of the two signals. The conditioning signal may either be a digital pulsed signal or an alternating signal.

However, the frequency of the applied conditioning signal is typically 0.5 KHz and the RMS voltage of the signal is typically 2 Volts. However, it will be appreciated that any suitable frequency and voltage may be used.

While the invention has been described with reference to several embodiments, it will be understood by those skilled in the art that various changes in form and detail may be made therein without departing from the spirit and scope of the invention.

The invention claimed is:

1. A fluidic oscillator liquid flow meter comprising:
 a body including:
  an inlet portion to receive a flow of fluid to be measured,
  an outlet portion, and
  a main channel defining a flow path, the flow path including feedback structure to induce oscillations in the fluid flow:
 a detector that detects the oscillations, the detector including:
  magnetic field generating means for applying a magnetic field across the flow path, and at least one pair of sensing electrodes that detect an e.m.f. generated as a result of the oscillations in the fluid flow in the presence of the applied magnetic field, a driving signal applicator that applies an alternating driving signal as a conditioning signal to the at least one pair of sensing electrodes to prevent polarization of the at least one pair of sensing electrodes in use, and a signal processor that:
processes signals received from the at least one pair of sensing electrodes, the signals being representative of the detected e.m.f., and
ignores the conditioning signal.

2. The fluidic oscillator liquid flow meter according to claim 1, wherein the frequency of the alternating driving signal is different from a range of signals produced by the oscillations in the fluid flow.

3. The fluidic oscillator liquid flow meter according to claim 1, wherein the alternating driving signal has a frequency of between 200 Hz and 1 MHz.

4. The fluidic oscillator liquid flow meter according to claim 3, wherein the alternating driving signal has a frequency between 700 Hz and 1 KHz.

5. The fluidic oscillator liquid flow meter according to claim 1, wherein the alternating driving signal is a sine wave.

6. The fluidic oscillator liquid flow meter according to claim 1, wherein the alternating driving signal is a saw-tooth wave.

7. The fluidic oscillator liquid flow meter according to claim 1, wherein the alternating driving signal is substantially a square wave.

8. The fluidic oscillator liquid flow meter according to claim 1, wherein the alternating driving signal is applied to the at least one pair of electrodes via capacitors.

9. The fluidic oscillator liquid flow meter according to claim 1, wherein the alternating driving signal has a voltage between 0 volts and 3.6 volts.

10. The fluidic oscillator liquid flow meter of claim 1, the signal processor comprising:
a memory configured to receive and store signals sensed by the at least one pair of sensing electrodes that represent the detected e.m.f., and
a comparison processor connected to the memory, the comparison processor adapted to compare a received signal with at least one other signal stored in the memory in order to determine whether the received signal is indicative of fluid flow.

11. The fluidic oscillator liquid flow meter according to claim 10, wherein the memory is adapted to store at least two most recently received signals from the at least one pair of sensing electrodes.

12. The fluidic oscillator liquid flow meter according to claim 11, wherein the memory is adapted to store the most recently received signal from the at least one pair of sensing electrodes, and a predetermined number of previously received signals.

13. The fluidic oscillator liquid flow meter according to claim 12, wherein the comparison processor is adapted to compare a received signal and a previously received signal to determine whether the received signal differs by more than a predetermined threshold value from the previously received signal.

14. The fluidic oscillator liquid flow meter according to claim 13, wherein it is determined that the received signal is not indicative of fluid flow on the condition that the received signal differs from the previously received signal by more than the predetermined threshold value.

15. The fluidic oscillator liquid flow meter according to claim 12, wherein the comparison processor is adapted to compare the most recently received signal to an average of the predetermined number of previously received signals in order to determine whether the most recently received signal differs from the average by more than a predetermined threshold value.

16. The fluidic oscillator liquid flow meter according to claim 15, wherein it is determined that the most recently received signal is not indicative of fluid flow on the condition that the most recently received signal differs from the average of the predetermined number of previously received signals by more than the predetermined threshold value.

17. The fluidic oscillator liquid flow meter according to claim 11, wherein the memory is adapted to store known or received patterns of signals, and the comparison processor is adapted to compare a received signal with a received pattern of signals to determine whether the received signal is indicative of fluid flow.

18. A fluidic oscillator liquid flow meter comprising:
a body including:
an inlet portion to receive a flow of fluid to be measured,
an outlet portion, and
a main channel defining a flow path between the inlet portion and the outlet portion, the flow path including feedback structure to induce oscillations in the fluid flow, the feedback structure comprising:
two feedback channels that split off from the main channel and rejoin the main channel at a position adjacent to the inlet portion;
the fluidic oscillator liquid flow meter further comprising:
a detector that detects the oscillations, the detector including:
magnetic field generating means for applying a magnetic field across the flow path, and
at least one pair of sensing electrodes that detect an e.m.f. generated as a result of the applied magnetic field,
wherein,
the at least one pair of sensing electrodes are positioned so as to protrude from a surface of the body into the flow path at a location in the flow path selected from the group consisting of:
in the feedback channels,
in the main channel between a position at which the feedback channels split off from the main channel and a position at which the feedback channels rejoin the main channel,
in the main channel at a position adjacent to the position at which the feedback channels split off from the main channel, and
in the main channel at a position adjacent to the position at which the feedback channels rejoin the main channel.

19. The fluidic oscillator liquid flow meter according to claim 18, wherein at least one sensing electrode of the at least one pair of sensing electrodes protrudes from the surface of the body into the flow path to as much as 50% of a dimension of the main channel.

20. The fluidic oscillator liquid flow meter according to claim 18, wherein the feedback structure further comprises a splitter positioned in the main channel that causes the feedback channels to split off from the main channel and induces the oscillations in the fluid flow.

21. The fluidic oscillator liquid flow meter according to claim 18, comprising two pairs of the sensing electrodes.

22. The fluidic oscillator liquid flow meter according to claim 21, wherein one pair of the sensing electrodes is located in each feedback channel.

23. The fluidic oscillator liquid flow meter according to claim 21, wherein one pair of the sensing electrodes is located in one of the feedback channels and one pair of the sensing electrodes is located in the main channel.

24. The fluidic oscillator liquid flow meter according to claim 18, wherein the magnetic field generating means comprises at least one permanent magnet.

25. The fluidic oscillator liquid flow meter according to claim 24, wherein the at least one permanent magnet is embedded in at least one wall of the body of the meter and is electrically insulated from the fluid flow.

26. The fluidic oscillator liquid flow meter according to claim 24, wherein the at least one permanent magnet includes an electrically non-conducting material.

27. The fluidic oscillator liquid flow meter according to claim 26, wherein the at least one permanent magnet forms a portion of at least one wall of the body.

28. A method of stabilising and filtering signal detection in a fluidic oscillator liquid flow meter comprising a body having an inlet portion to receive a flow of fluid to be measured, an outlet portion, a main channel defining a flow path, the flow path including feedback structure to induce oscillations in the fluid flow, and a detector that detects the oscillations, the detector comprising magnetic field generating means, at least one pair of sensing electrodes, and a signal processor including a memory and a comparison processor connected to the memory, the method comprising:

operating the magnetic field generating means to apply a magnetic field across the flow path:

detecting, using the at least one pair of sensing electrodes, an e.m.f. that is generated as a result the oscillations in the fluid flow in the presence of the applied magnetic field; and applying an alternating driving signal as a conditioning signal to the at least one pair of sensing electrodes to prevent polarization of the at least one pair of sensing electrodes in use;

passing signals sensed by the at least one pair of sensing electrodes that represent the detected e.m.f. from the at least one pair of sensing electrodes to the signal processor; and processing, using the signal processor, the signals received from the at least one pair of sensing electrodes, the signals being representative of the detected e.m.f., and ignoring the conditioning signal.

29. The method of stabilizing and filtering signal detection in a fluidic oscillator liquid flow meter according to claim 28, wherein the alternating driving signal has a frequency of between 200 Hz and 1 MHz.

30. The method of stabilizing and filtering signals in a fluidic oscillator liquid flow meter according to claim 28, further comprising:

receiving and storing the signals in the memory;

operating the comparison processor to compare a received signal with at least one other signal stored in the memory; and determining whether the received signal is indicative of fluid flow based on the comparison of the received signal with the at least one other signal stored in the memory, wherein at least two most recently received signals from the at least one pair of sensing electrodes are stored in the memory.

31. The method of stabilizing and filtering signals in a fluidic oscillator liquid flow meter according to claim 30, further comprising:

storing in the memory the most recently received signal from the at least one pair of sensing electrodes, and a predetermined number of previously received signals.

32. The method of stabilizing and filtering signals in a fluidic oscillator liquid flow meter according to claim 30, wherein it is determined that the received signal is not indicative of fluid flow on the condition that the received signal differs by more than a predetermined threshold value from the at least one other signal.

33. The method of stabilizing and filtering signals in a fluidic oscillator liquid flow meter according to claim 30, further comprising:

storing in the memory known or received patterns of signals, and comparing a set of received signals with the pattern in the comparison processor, to determine whether a particular signal should be counted.

* * * * *